(12) United States Patent
Kunai

(10) Patent No.: US 12,596,286 B2
(45) Date of Patent: Apr. 7, 2026

(54) OPTICAL PHASE MODULATOR, OPTICAL DEVICE, AND OPTICAL COMPUTING DEVICE

(71) Applicant: FUJIKURA LTD., Tokyo (JP)

(72) Inventor: Yuichiro Kunai, Tokyo (JP)

(73) Assignee: Fujikura Ltd., Tokyo (JP)

( * ) Notice: Subject to any disclaimer, the term of this patent is extended or adjusted under 35 U.S.C. 154(b) by 311 days.

(21) Appl. No.: 18/262,613

(22) PCT Filed: Jan. 27, 2022

(86) PCT No.: PCT/JP2022/003084
§ 371 (c)(1),
(2) Date: Jul. 24, 2023

(87) PCT Pub. No.: WO2022/163753
PCT Pub. Date: Aug. 4, 2022

(65) Prior Publication Data
US 2024/0427214 A1     Dec. 26, 2024

(30) Foreign Application Priority Data

Jan. 28, 2021    (JP) ................................. 2021-012353

(51) Int. Cl.
*G02F 1/225*        (2006.01)
*H04B 10/548*       (2013.01)
(52) U.S. Cl.
CPC ............ *G02F 1/225* (2013.01); *H04B 10/548* (2013.01)

(58) Field of Classification Search
CPC ... G02F 1/05–0541; G02F 1/225–2257; G02F 1/0036; G02F 1/09–094; H04B 10/548–5563
See application file for complete search history.

(56) References Cited

U.S. PATENT DOCUMENTS 4,195,908 A * 4/1980 Kestigian .............. G02F 1/0036
                                              359/324
10,437,082 B2 * 10/2019 Banks .................. G02B 27/286
                         (Continued)

FOREIGN PATENT DOCUMENTS

JP          2001264716 A      9/2001
JP          2005181707 A      7/2005
                 (Continued)

OTHER PUBLICATIONS

Irvine, S.E., et al., "A miniature broadband bismuth-substituted yttrium iron garnet magneto-optic modulator", Journal of Physics D: Applied Physics, vol. 36, pp. 2218-2221, Sep. 3, 2003 (6 pages).
(Continued)

*Primary Examiner* — Rhonda S Peace
(74) *Attorney, Agent, or Firm* — Osha Bergman Watanabe & Burton LLP

(57) ABSTRACT
An optical phase modulator includes a block constituting a magnetic free layer and having a first face, a second face opposite to the first face, an entrance face different from the first face or the second face and through which light enters, and an exit face different from the first face or the second face and through which light exits. The optical phase modulator includes a first electrode disposed to the first face, either directly or not directly on the first face.

13 Claims, 5 Drawing Sheets

(56) References Cited

U.S. PATENT DOCUMENTS

| | | | |
|---|---|---|---|
| 2004/0047021 A1* | 3/2004 | Sakane | G02B 6/4208 |
| | | | 359/237 |
| 2008/0198439 A1* | 8/2008 | Cho | G02F 1/091 |
| | | | 359/280 |
| 2016/0109733 A1* | 4/2016 | Porte | G02F 1/0356 |
| | | | 385/3 |
| 2016/0109734 A1* | 4/2016 | Porte | G02F 1/225 |
| | | | 385/3 |
| 2020/0333668 A1 | 10/2020 | Hu et al. | |
| 2021/0026168 A1* | 1/2021 | Partee | G02F 1/095 |
| 2024/0310690 A1* | 9/2024 | Kunai | C09K 19/3809 |
| 2024/0427214 A1* | 12/2024 | Kunai | G02F 1/225 |

FOREIGN PATENT DOCUMENTS

| | | |
|---|---|---|
| JP | 2007510174 A | 4/2007 |
| JP | 2017198949 A | 11/2017 |
| JP | 2018017881 A | 2/2018 |
| JP | 2020153859 A | 9/2020 |
| WO | 2019149758 A1 | 8/2019 |

OTHER PUBLICATIONS

Iwasaki, K., et al., "Fabrication and Properties of Spatial Light Modulator with Magneto-Optical Faraday Effect", Proceedings of SPIE, vol. 6311, pp. 631116-1-631116-8, Aug. 30, 2006 (9 pages).

Park, J., et al., "Magnetooptic Spatial Light Modulator for Volumetric Digital Recording System", Japanese Journal of Applied Physics, vol. 41, Part 1, No. 3B, pp. 1813-1816, Mar. 2002 (4 pages).

International Search Report issued in corresponding International Application No. PCT/JP2022/003084, dated Apr. 12, 2022 (4 pages).

Written Opinion issued in corresponding International Application No. PCT/JP2022/003084, dated Apr. 12, 2022, with translation dated Jul. 31, 2023 (9 pages).

Sobolewski, R., et al., "Magneto-Optical Modulator for Superconducting Digital Output Interface", IEEE Transactions on Applied Superconductivity, vol. 11, No. 1, pp. 727-730, Mar. 2001 (4 pages).

Wan, J., et al., "Design of a novel high-speed magneto-optic modulator", Proceedings of SPIE, vol. 6782, pp. 67821Q-1-67821Q-9, Nov. 19, 2007 (10 pages).

* cited by examiner

OPTICAL PHASE MODULATOR, OPTICAL DEVICE, AND OPTICAL COMPUTING DEVICE

BACKGROUND

Technical Field

The present invention relates to an optical phase modulator. Further, the present invention relates also to an optical device and an optical computing device that include a plurality of optical phase modulators.

Description of the Related Art

A spatial light modulator is obtained by arranging a plurality of optical modulators in a matrix. As the spatial light modulator, a liquid crystal on silicon (LCOS, see, for example, Patent Literature 1) and a digital mirror device (DMD, see, for example, Patent Literature 2) are known. These spatial light modulators are used in, for example, projectors.

Patent Literature

Patent Literature 1: Japanese Patent Application Publication, Tokukai, No. 2017-198949
Patent Literature 2: Japanese Translation of PCT International Application, Tokuhyo, No. 2007-510174

There is a difficulty of reducing a pixel size with these spatial light modulators.

In addition, there is a difficulty of operating an LCOS and a DMD at high speed with an LCOS and a DMD. This is because a liquid crystal is used in an LCOS and a mirror is mechanically moved in a DMD.

SUMMARY

One or more embodiments provide an optical phase modulator capable of being made more compact and operating at high speed.

An optical phase modulator in accordance with one or more embodiments includes: a block constituting a magnetic free layer, the block including: a first face and a second face which form a pair and which face each other; and an entrance face and an exit face which are not the first face or the second face and through which light enters and exits; a magnetic fixed layer provided to the first face, either directly or not directly on the first face; and a first electrode and a second electrode facing each other, the first electrode, the magnetic fixed layer, the block, and the second electrode being disposed in this order.

With one or more embodiments, it is possible to provide an optical phase modulator capable of being made more compact and operating at high speed. It is also possible to provide an optical device and an optical computing device that include a plurality of optical phase modulators each of which is such an optical phase modulator.

DESCRIPTION OF THE EMBODIMENTS

Example 1

Figure 1:
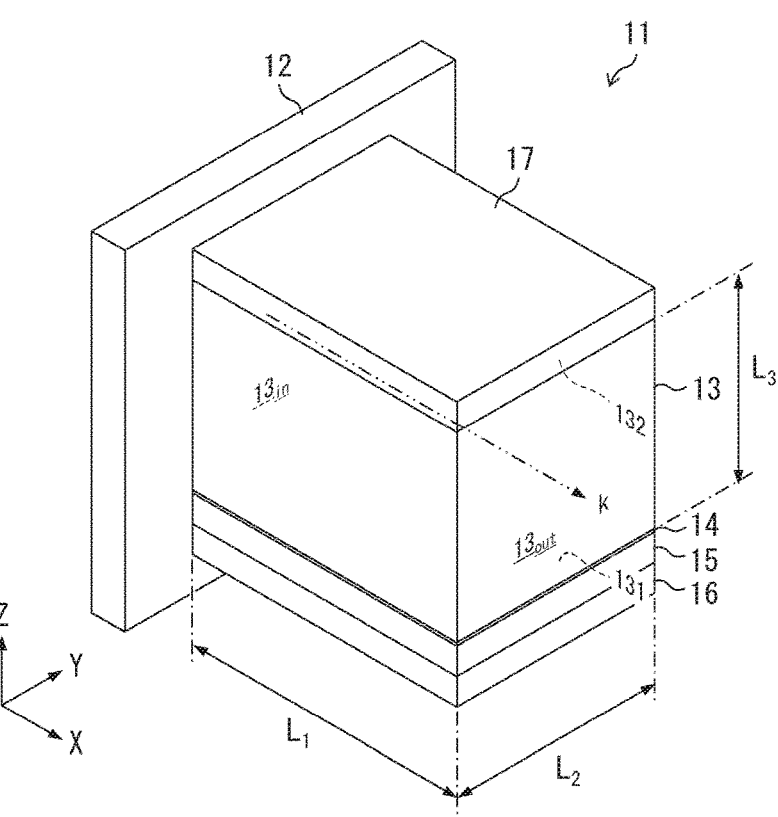
FIG. 1 is a perspective view of an optical phase modulator in accordance with Example 1.
Figure 2:
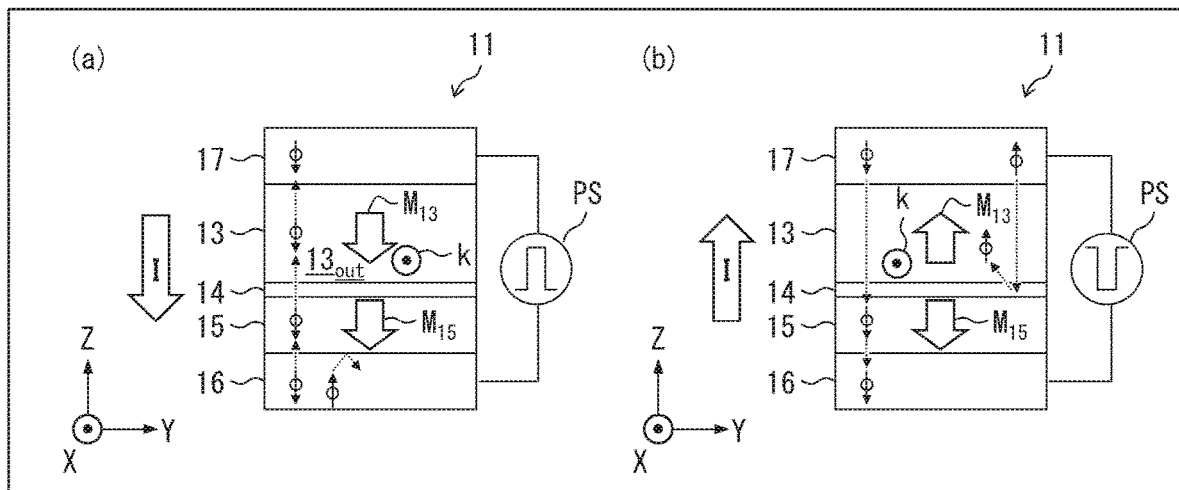
FIG. 2 is a schematic view of the optical phase modulator illustrated in FIG. 1.
Figure 3:
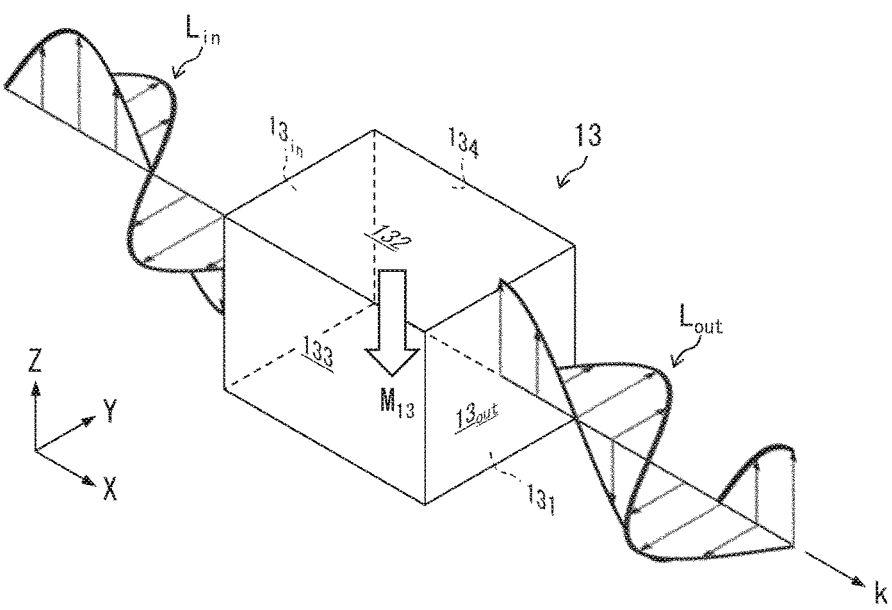
FIG. 3 is a perspective view of a block of the optical phase modulator illustrated in FIG. 1.
Figure 4:
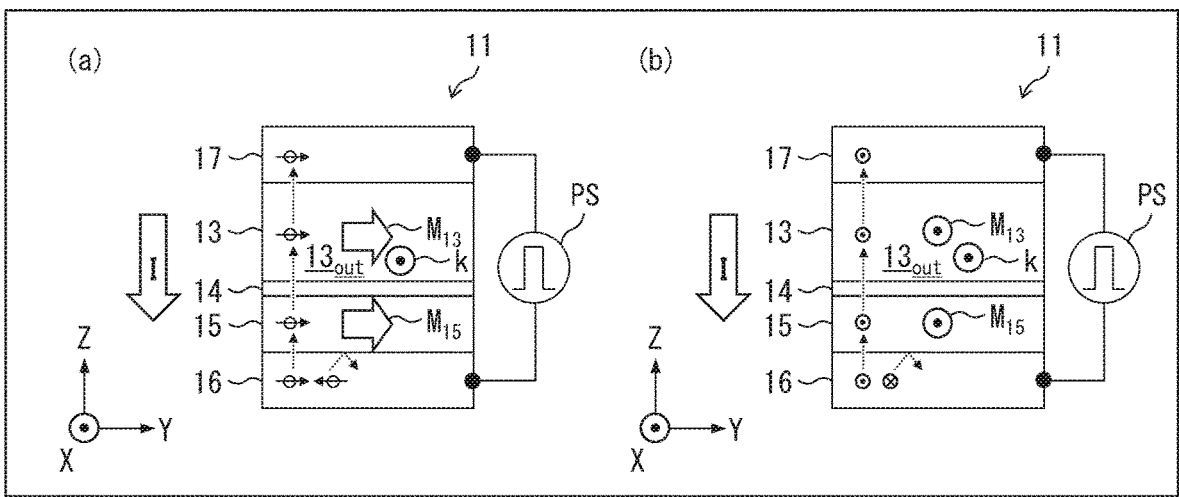
FIG. 4 is a schematic view of Variation 1 and Variation 2 of the optical phase modulator illustrated in FIG. 1.

The following description will discuss an optical phase modulator 11 in accordance with Example 1 with reference to FIGS. 1 to 4. FIG. 1 is a perspective view of the optical phase modulator 11. (a) and (b) of FIG. 2 are schematic views of the optical phase modulator 11. (a) of FIG. 2 illustrates a state in which a current flows from an electrode 17 to an electrode 16 and (b) of FIG. 2 illustrates a state in which a current flows from the electrode 16 to the electrode 17. FIG. 3 is a perspective view of a block 13 of the optical phase modulator 11. FIG. 3 is a perspective view for explaining the function of the optical phase modulator 11. (a) and (b) of FIG. 4 are schematic views of Variation 1 and Variation 2 of the optical phase modulator 11, respectively. Both (a) and (b) of FIG. 4 illustrate a state in which a current flows from the electrode 17 to the electrode 16.

Note that, in Example 1, visible light having a wavelength of 400 nm to 800 nm is employed as light Lin (see FIG. 3) entering the optical phase modulator 11. However, the wavelength of the light Lin is not limited to visible light, but can be selected from a region such as the ultraviolet region or the near-infrared region as appropriate.

<Configuration of Optical Phase Modulator>

As illustrated in FIG. 1, the optical phase modulator 11 includes: a substrate 12; the block 13; a spacer layer 14; a magnetic fixed layer 15; the electrode 16; and the electrode 17.

Note that, in FIG. 1, a direction which is the normal direction of an entrance face 13in and an exit face 13out of the block 13 and which trends from the entrance face 13in and the exit face 13out is defined as a positive x-axis direction. Further, a direction which is a normal direction of a face 131 and a face 132 of the block 13 and which trends from the face 131 to the face 132 is defined as a positive z-axis direction. A direction constituting the right-handed orthogonal coordinate system together with the positive x-axis direction and the positive z-axis direction is defined as a positive y-axis direction.

In the optical phase modulator 11, the light Lin enters through the substrate 12 from a negative x-axis direction so as to be perpendicular to the entrance face 13in. Light incident on the entrance face 13in propagates through the block 13 toward the exit face 13out. In FIG. 1, a traveling direction of the light propagating through the block 13 is indicated by an arrow k of a two-dot chain line. Also in FIGS. 2, 3, and 4, the traveling direction of the light is indicated with use of the arrow k. The traveling direction of the light is the same as the positive x-axis direction. Light having propagated through the block 13 and having reached the exit face 13out is exited from the exit face 13out as light Lout. The light Lout exits in the positive x-axis direction so as to be perpendicular to the exit face 13out. However, the angle of incidence of the light Lin with respect to the entrance face 13in is not limited to 90°. This angle of incidence may deviate from 90°.

(Substrate)

The substrate 12 is a plate-shaped member made of a material which is transparent to the light Lin. The material of the substrate 12 has as high a transmittance as possible with respect to the light Lin. In Example 1, quartz glass is employed as the material of the substrate 12. However, the material of the substrate 12 is not limited to the quartz glass, but can be selected as appropriate according to, for example, the transmittance and the refractive index with respect to the light Lin, the hardness, and the cost. The thickness (length along the x-axis direction in the coordinate system illustrated in FIG. 1) of the substrate 12 can be determined as appropriate. A face including the entrance face 13in of the optical phase modulator 11 (also referred to as a back face of the optical phase modulator 11) is fixed to one main face (the main face that is located further in the positive x-axis direction) of the substrate 12. In Example 1, a resin having light transparency is used as a fixing member for fixing the optical phase modulator 11 to the substrate 12. However, the fixing member is not limited to this.

(Block)

Like the substrate 12, the block 13 is made of a material that is transparent to the light Lin. However, the block 13, unlike the substrate 12, contains magnetic atoms. The block 13 has a magnetization state that is not fixed. Thus, the block 13 is not limited to any particular material provided that the magnetic susceptibility of the material is easily varied by the spin injection. Various materials such as paramagnetic material and a ferromagnetic material can be used as the material of the block 13. The block C13 may be made so as to exhibit ferromagnetism at room temperature (e.g., 25° C.) in order to achieve a higher magnetic susceptibility. Thus, a ferromagnetic material that has a relatively high spin polarizability is suitably used as the material of the block 13. The spin polarizability may be, for example, not less than 50%. In Example 1, CoFeB is employed as the material of the block 13. However, the material of the block 13 is not limited to this, but CoFe, NiFe, Fe, Ni, Co, or the like can be suitably used as the material of the block 13. Furthermore, the block C13 does not need to be composed of a single constituent, but an insulating material (e.g., alumina or glass) to which fine particles of the above material are added can also be employed.

As will be described later, the magnetic fixed layer 15 is also made of a material that exhibit ferromagnetism (more specifically, hard magnetism). In this respect, the coercive force of the block 13 is smaller than the coercive force of the magnetic fixed layer 15. This makes it possible to change the direction of the magnetization M13 of the block 13 while the direction of the magnetization M15 in the magnetic fixed layer 15 remains fixed. Among the directions parallel or substantially parallel to the magnetization M15, the magnetization M13 may take on directions the same as and opposite to the direction of the magnetization M15.

Employed as the material of the block 13in Example 1 is a ferromagnetic material that is sufficiently small at room temperature in coercive force and in remanent magnetization (i.e., a soft magnetic material). The material of the block 13 is not limited to a soft magnetic material. However, by using a soft magnetic material to make the block 13, the block 13 has remanent magnetization that remains in the block 13 when the injection of polarized electrons is stopped and that is sufficiently smaller than the saturated magnetization thereof at room temperature. Thus, in a case of using the block 13 having volatility, as the material of the block 13, the ferromagnetic material, having remanent magnetization at room temperature sufficiently smaller than the saturated magnetization thereof at room temperature, may be used. As used herein, the remanent magnetization at room temperature being sufficiently smaller than the saturated magnetization at room temperature means that the remanent magnetization at room temperature is, for example, not less than 0% and less than 10% of the saturated magnetization at room temperature.

With this configuration, when spin-polarized electrons are injected into the block 13, magnetic interaction occurs between the magnetic atoms contained in the block 13, and the magnetization M13 is generated accordingly. Furthermore, when the injection of spin-polarized electrons is stopped, the interaction acting between the magnetic atoms contained in the block 13 disappears, and the magnetization M13 also disappears. Thus, with this configuration, it is possible to cause the magnetization M13 to be generated or disappear in a volatile manner, by using injection of spin-polarized electrons. As a result, with the optical phase modulator 11, it is possible to control the degree of phase delay in a predetermined component of the light propagating through the block 13.

Note that, as in an optical phase modulator 21 which will be described later with reference to FIG. 5, a ferromagnetic material having remanent magnetization at room temperature that is larger than the saturated magnetization thereof at room temperature (i.e., a hard magnetic material) may be used for the block 13. As used herein, the remanent magnetization at room temperature being larger than the saturated magnetization at room temperature means that the remanent magnetization at room temperature is, for example, not less than 90% and not more than 100% of the saturated magnetization at room temperature.

With this configuration, the magnetization M13 generated by injection of spin-polarized electrons remains without disappearing after the injection of spin-polarized electrons is stopped. Thus, in a case of employing this configuration, it is possible to delay the phase of a predetermined component in a nonvolatile manner even after the injection of spin-polarized electrons is stopped.

Note that, according to one or more embodiments, the proportion of remanent magnetization of the material of the block 13 at room temperature to the saturated magnetization of the material of the block 13 at room temperature is not limited to not less than 0% and less than 10%, or not less than 90% and not more than 100%, but may be not less than 10% and less than 90%.

Also, in a case where the block 13 exhibits paramagnetism, the magnetization M13 may take on various directions. However, in a case where spin-polarized electrons are injected into the block 13, among the directions parallel or substantially parallel to the magnetization M15, the magnetization M13, when considered macroscopically, may take on directions the same as and opposite to the direction of the magnetization M15.

As illustrated in FIG. 3, the block 13 has the shape of a rectangular parallelepiped. Thus, the surface of the block 13 is constituted by six faces. However, the shape of the block 13 is not limited to a rectangular parallelepiped, but may be a rectangular parallelepiped-like shape. As will be described later, the shapes of the entrance face 13in and the exit face 13out are not limited to a rectangular shape or a rectangle-like shape.

In FIG. 3, two faces parallel to an xy plane and facing each other are defined as faces 131 and 132. The face 131 and the face 132 are an example of the first face and an example of the second face, respectively. Further, in FIG. 3, two faces parallel to a yz plane and facing each other are defined as the entrance face 13in and the exit face 13out. Furthermore, in FIG. 3, two faces parallel to a zx plane and facing each other are defined as faces 133 and 134. Hereinafter, the face containing the exit face 13out and the face containing the entrance face 13in are defined as the front face and the back face of the optical phase modulator 11, respectively, and the faces containing the faces 131 to 134 are defined as the side faces of the optical phase modulator 11.

In a case where the entrance face 13in and the exit face 13out are regarded as a pair of bottom faces, the block 13 can be a columnar microcell. As used herein, the term "microcell" refers to a cell having a cell size of, for example, less than 10 μm. Further, the term "cell size" refers to the square root of the area of the entrance face 13in or the exit face 13out. The entrance face 13in and the exit face 13out may have the shape of a rectangle or a rectangle-like shape. Note that this shape may contain at least a pair of sides parallel to each other, and may be a trapezoid, or may be a parallelogram.

Hereinafter, among the edges of the block 13, the length (thickness of the block 13) of an edge along the x-axis direction is defined as a length L1, the length (length of one side of the entrance face 13in and the exit face 13out) of an edge along the y-axis direction is defined as a length L2, and the length (length of another side of the entrance face 13in and the exit face 13out of an edge along the z-axis direction is defined as a length L3.

In Example 1, the length L1 is approximately 1 μm and the lengths L2 and L3 are approximately 800 nm. However, the lengths L1, L2, and L3 are not limited to these lengths. The lengths L2 and L3 can be determined as appropriate so as to be within ranges by which the cell size is less than 10 μm. The length L1 can be determined as appropriate. Further, the block 13 may have a refractive index that is determined so as to be a desired value by adjusting the material of the block 13 as appropriate.

In Example 1, the entrance face 13in and the exit face 13out are both smooth faces (i.e., flat faces). However, the entrance face 13in and the exit face 13out are not limited to flat faces, but may be provided with irregularities. This structure with irregularities may be a periodic structure or may be a random structure. By designing the structure with irregularities as appropriate, it is possible to reduce reflection loss that can be generated at the entrance face 13in and the exit face 13out.

In Example 1, the faces 131 and 132 are parallel to each other. As will be described later, the spacer layer 14, the magnetic fixed layer 15, and the electrode 16 are provided to the face 131, and the electrode 17 is provided to the face 132. When the face 131 is flat, it is easy to form the spacer layer 14 which is uniform in thickness. When the faces 131 and 132 are parallel to each other, it is easy to inject, into the block 13, a current which is uniform in current density. Thus, the faces 131 and 132 may be flat and parallel to each other. However, the faces 131 and 132 may contain irregularities. Optionally, the faces 131 and 132 are not parallel to each other.

Further, in Example 1, the faces 133 and 134 are parallel to each other. However, the faces 133 and 134 may contain irregularities. Optionally, the faces 133 and 134 are not parallel to each other.

(Spacer Layer)

The spacer layer 14 is a layered member made of an insulating material. The spacer layer 14 is interposed between the block 13 and the magnetic fixed layer 15 (described later) to insulate the block 13 and the magnetic fixed layer 15. The spacer layer 14, together with the block 13 and the magnetic fixed layer 15, forms a tunnel junction. Thus, the spacer layer 14 has a thickness that can be determined as appropriate to be within a range that allows generation of tunneling current. A typical thickness of the spacer layer 14 is not less than 2 nm and not more than 3 nm. However, the thickness of the spacer layer 14 is not limited to this. The spacer layer 14 may be made of a film that does not include a pinhole and has a uniform thickness in order to exhibit good tunneling characteristics. Using spin-polarized electrons as electrons responsible for the tunneling current enables the magnetization of the block 13 to be switched at higher speed with lower power.

In Example 1, aluminum oxide (Al2O3) is employed as the insulating material of the spacer layer 14. However, the insulating material is not limited to aluminum oxide. As the insulating material, for example, an insulating material of the spacer layer of a magnetoresistive random access memory (MRAM) can be used.

Note that the spacer layer 14 can be omitted in the optical phase modulator 11. In a case where the spacer layer 14 is provided, the magnetic fixed layer 15 (described later) is provided to the face 131, via the spacer layer 14 (i.e., not directly). On the other hand, in a case where the spacer layer 14 is omitted, the magnetic fixed layer 15 is provided directly on the face 131.

(Magnetic Fixed Layer)

The magnetic fixed layer 15 is a layered member made of an electrically conductive ferromagnetic material. In Example 1, the magnetic fixed layer 15 is provided to the face 131, not directly on the face 131, via the spacer layer 14. However, the magnetic fixed layer 15 may be provided directly on the face 131.

The ferromagnetic material of the magnetic fixed layer 15 exhibits ferromagnetism at room temperature. The magnetic fixed layer 15 has a greater coercive force than the block 13 has. In Example 1, a permalloy, which is an alloy of nickel and iron, is employed as the ferromagnetic material of the magnetic fixed layer 15. Examples of the composition ratio between nickel and iron include, but are not limited to, Ni81Fe19. The ferromagnetic material is not limited to a permalloy. As the ferromagnetic material, a ferromagnetic material of the magnetic fixed layer of an MRAM, such as, for example, magnesium oxide, can be used.

In addition, the thickness of the magnetic fixed layer 15 is not limited, but can be determined as appropriate.

The magnetic fixed layer 15 falls roughly into a perpendicular-to-plane magnetization type or an in-plane magnetization type according to the direction of the magnetization M15.

In the magnetic fixed layer 15 of a perpendicular-to-plane magnetization type, the direction of the magnetization M15 is parallel to the normal direction (z-axis direction) of the main faces of the magnetic fixed layer 15, as illustrated in FIG. 2. In Example 1, the magnetic fixed layer 15 which is of a perpendicular-to-plane magnetization type and which has the magnetization M15 the direction of which is a negative z-axis direction. With this configuration, the direction (z-axis direction) of the magnetization M15 is orthogonal or substantially orthogonal to the traveling direction (x-axis direction) of the light (see FIG. 3). This makes it possible to delay the phase of a component of light, the light propagating through the block 13 so as to be parallel to the x-axis direction, the component being polarized in a direction orthogonal to the direction of the magnetization M15

(polarized in a direction parallel to the y-axis direction). Hereinafter, such a component is referred to as a y-direction component. The situation illustrated in FIG. 3 is that the light Lin passes through the block 13 and is converted into the light Lout, and due to this, a component of the light Lin, the component being polarized in a direction orthogonal to the direction of the magnetization M15, is delayed in phase for ¼ of the wavelength thereof, in comparison with the component being polarized in a direction parallel to the direction of the magnetization M15 (hereinafter, an x-direction component). Note that, the degree to which the block 13 delays the phase of the y-direction component depends on the magnetic field formed inside the block 13. This degree therefore depends on the magnitude of the magnetization M15.

In the magnetic fixed layer 15 of an in-plane magnetization type, the direction of the magnetization M15 is parallel to the main faces of the magnetic fixed layer 15, as illustrated in (a) and (b) of FIG. 4. That is, the direction of the magnetization M15 may take on any direction in a plane parallel to the xy plane. When the magnetic fixed layer 15 of an in-plane magnetization type is employed, as illustrated in (a) of FIG. 4, the direction (y-axis direction) of the magnetization M15 only needs to intersect the traveling direction (x-axis direction) of the light, and may be orthogonal to the traveling direction. With this configuration, it is possible to delay the phase of a component of light, the light propagating through the block 13 so as to be parallel to the x-axis direction, the component being polarized in a direction orthogonal to the direction of the magnetization M15 (polarized in a direction parallel to the z-axis direction).

Note that, as illustrated in (b) of FIG. 4, in a case of employing the magnetic fixed layer 15 having magnetization M15 the direction of which is parallel to the x-axis direction, the direction of the magnetization M15 is parallel to the traveling direction (x-axis direction) of the light. In this case, the phase of light, the light propagating through the block 13 so as to be parallel to the x-axis direction, is not affected by the magnetization M15 at all. Thus, the magnetic fixed layer 15 having the magnetization M15 the direction of which is parallel to the x-axis direction cannot be employed in Example 1. However, this configuration can be used to cancel the function of delaying the phase in the block 13, as will be described later with reference to FIG. 5.

The direction of the magnetization M15 generated when spin-polarized electrons flow through the optical phase modulator 11 will be described later with reference to FIGS. 2 and 4.

(Pair of Electrodes)

Both of the electrodes 16 and 17 which form a pair of electrodes are layered members made of a conductor. In Example 1, copper is employed as the conductor of the electrodes 16 and 17. However, this conductor is not limited to copper. The conductor may have a high conductivity. Examples of the conductor include aluminum and gold, in addition to copper.

The electrode 16 is provided to the face 131 via the spacer layer 14 and the magnetic fixed layer 15. Thus, the spacer layer 14, the magnetic fixed layer 15, and the electrode 16 are disposed on top of each other on the face 131 in this order. The electrode 17 is provided directly on the face 132. Therefore, the electrodes 16 and 17 are provided so as to face each other, and the electrode 16, the magnetic fixed layer 15, the spacer layer 14, and the electrode 17 are disposed in this order. In other words, the electrodes 16 and 17 have the block 13, the spacer layer 14, and the magnetic fixed layer 15 sandwiched therebetween. The electrode 16 and the electrode 17 are an example of the first electrode and an example of the second electrode, respectively.

A positive electrode or a negative electrode of a power supply PS are connected to each of the electrodes 16 and 17, so that a voltage between the electrodes can be applied (see FIGS. 2 and 4). The block 13 is magnetized by injecting spin-polarized electrons into the block 13 with use of the electrodes 16 and 17, as will be described later. The block 13 functions as an optical path of light propagating from the entrance face 13in toward the exit face 13out. Thus, the electrodes 16 and 17 are capable of applying a voltage to the block 13, the spacer layer 14, and the magnetic fixed layer 15 so that a magnetic field is generated in at least a portion of the optical path of light propagating from the entrance face 13in toward the exit face 13out.

<Magnetization Direction of Block>

The following description will discuss, with reference to FIGS. 2 and 4, the magnetization M15 of the block 13 generated in a case where the power supply PS supplies a current to the optical phase modulator 11.

(Perpendicular-to-Plane Magnetization Type)

Explained with reference to FIG. 2 is the magnetization M13 generated in a case of employing the magnetic fixed layer 15 which is of a perpendicular-to-plane magnetization type and which has the magnetization M15 the direction of which is a direction (negative z-axis direction) trending from the block 13 to the electrode 16.

As illustrated in (a) of FIG. 2, the positive electrode (an electrode having a higher potential) of the power supply PS is connected to the electrode 17, and a negative electrode (an electrode having a lower potential) of the power supply PS is connected to the electrode 16. In this case, in the optical phase modulator 11, a current flows in a direction trending from the electrode 17 to the electrode 16 (negative z-axis direction), and electrons flow in a direction trending from the electrode 16 to the electrode 17 (positive z-axis direction). Of the electrons, up spins are indicated by an upward arrow and down spins are indicated by a downward arrow in FIG. 2.

The direction of the down spin is the same as the direction of the magnetization M15. Thus, the down spins are injected through the electrode 16 and pass through the magnetic fixed layer 15 and the spacer layer 14 to be injected into the blocks 13, and reach the electrode 17. That is, the down spins are capable of flowing through the optical phase modulator 11.

The direction of the up spin is opposite to the direction of the magnetization M15. Thus, the up spins are reflected at the interface between the electrode 16 and the magnetic fixed layer 15. That is, the up spins are not capable of flowing through the optical phase modulator 11.

Therefore, a large amount of spin-polarized electrons (in this case, the down spins) are injected into the block 13, by flowing a current from the electrode 17 toward the electrode 16. Magnetic interaction via the down spins occurs between the magnetic atoms contained in the block 13. This generates the magnetization M13 the direction of which is the negative z-axis direction.

Further, as illustrated in (b) of FIG. 2, the negative electrode is connected to the electrode 17, and the positive electrode is connected to the electrode 16. In this case, in the optical phase modulator 11, a current flows in a direction trending from the electrode 16 to the electrode 17 (positive z-axis direction), and electrons flow in a direction trending from the electrode 17 to the electrode 16 (negative z-axis direction).

Both the up spins and the down spins move from the electrode 17 to the interface between the spacer layer 14 and the magnetic fixed layer 15, through the block 13 and the spacer layer 14. The down spins are injected into the magnetic fixed layer 15 and reach the electrode 16. That is, the down spins are capable of flowing through the optical phase modulator 11.

In contrast, the up spins are reflected at an interface between the spacer layer 14 and the magnetic fixed layer 15. That is, the up spins are not capable of flowing through the optical phase modulator 11.

Therefore, a large amount of spin-polarized electrons (in this case, the up spins) are injected into the block 13, by flowing a current from the electrode 16 toward the electrode 17. Magnetic interaction via the up spins occurs between magnetic atoms contained in the block 13. This generates the magnetization M13 the direction of which is the positive z-axis direction.

Which of the directions, the negative z-axis direction or the positive z-axis direction, is employed as the direction of the magnetization M13 can be selected as appropriate. In a case where the magnitude of the magnetization M13 varies depending on flow directions of the current, a flow direction of the current that causes the magnetization M13 to be greater should be selected.

(In-Plane Magnetization Type)

Explained with reference to (a) of FIG. 4 is the magnetization M13 generated in a case of employing the magnetic fixed layer 15 which is of an in-plane magnetization type and which has the magnetization M15 the direction of which is orthogonal to the traveling direction of light. Further, explained with reference to (b) of FIG. 4 is the magnetization M13 generated in a case of employing the magnetic fixed layer 15 which is of an in-plane magnetization type and which has the magnetization M15 the direction of which is parallel to the traveling direction of light. Note that the magnetization M13 will be described with reference to (a) and (b) of FIG. 4, by taking, as an example, the case where the positive electrode and the negative electrode of the power supply PS are connected respectively to the electrode 17 and the electrode 16. The case where the positive electrode and the negative electrode of the power supply PS are connected respectively to the electrode 16 and the electrode 17 can be understood similarly to the case of the perpendicular-to-plane magnetization type, and the description thereof will not be repeated.

In a case of employing the magnetic fixed layer 15 having the magnetization M15 which is orthogonal to the traveling direction of light, in the optical phase modulator 11, a current flows in a direction trending from the electrode 17 to the electrode 16 (negative z-axis direction), and electrons flow in a direction trending from the electrode 16 to the electrode 17 (positive z-axis direction). Of the electrons, up spins are indicated by a leftward arrow and down spins are indicated by a rightward arrow in (a) of FIG. 4.

The direction of the down spin is the same as the direction of the magnetization M15. Thus, the down spins are injected through the electrode 16 and pass through the magnetic fixed layer 15 and the spacer layer 14 to be injected into the blocks 13, and reach the electrode 17. That is, the down spins are capable of flowing through the optical phase modulator 11.

The direction of the up spin is opposite to the direction of the magnetization M15. Thus, the up spins are reflected at the interface between the electrode 16 and the magnetic fixed layer 15. That is, the up spins are not capable of flowing through the optical phase modulator 11.

Therefore, a large amount of spin-polarized electrons (in this case, the down spins) are injected into the block 13, by flowing a current from the electrode 17 toward the electrode

16. Magnetic interaction via the down spins occurs between the magnetic atoms contained in the block 13. This generates the magnetization M13 the direction of which is the positive y-axis direction.

In a case of employing the magnetic fixed layer 15 having the magnetization M15 which is parallel to the traveling direction of light, in the optical phase modulator 11, a current flows in a direction trending from the electrode 17 to the electrode 16 (negative z-axis direction), and electrons flow in a direction trending from the electrode 16 to the electrode 17 (positive z-axis direction). Of the electrons, up spins are indicated by an arrow pointing toward the back side of the drawing sheet (in the negative x-axis direction) and down spins are indicated by an arrow pointing toward the front side of the drawing sheet (in the positive x-axis direction), in (b) of FIG. 4.

The direction of the down spin is the same as the direction of the magnetization M15. Thus, the down spins are injected through the electrode 16 and pass through the magnetic fixed layer 15 and the spacer layer 14 to be injected into the blocks 13, and reach the electrode 17. That is, the down spins are capable of flowing through the optical phase modulator 11.

The direction of the up spin is opposite to the direction of the magnetization M15. Thus, the up spins are reflected at the interface between the electrode 16 and the magnetic fixed layer 15. That is, the up spins are not capable of flowing through the optical phase modulator 11.

Therefore, a large amount of spin-polarized electrons (in this case, the down spins) are injected into the block 13, by flowing a current from the electrode 17 toward the electrode 16. Magnetic interaction via the down spins occurs between the magnetic atoms contained in the block 13. This generates the magnetization M13 the direction of which is the positive x-axis direction.

<Variation 3 of Optical Phase Modulator>

In Variation 3 of the optical phase modulator 11, the spacer layer 14, the magnetic fixed layer 15, and the electrode 17 can be omitted from the configuration of the optical phase modulator 11. That is, Variation 3 includes: a block 13 constituting a magnetic free layer, the block 13 having a pair of faces 131 and 132 (an example of the first face and the second face) facing each other and an entrance face 13in and an exit face 13out which are not the face 131 or the face 132 and through which light enters and exits; and an electrode 16 (an example of the first electrode) provided to a face 131, either directly or not directly on the face 131.

The optical phase modulator 11 is configured in the same manner as a spin transfer torque magnetic reversal (STT)-magnetoresistive random access memory (MRAM), although having a magnetic free layer constituted by a block. In contrast, a comparative example of Variation 3 is configured similarly to a spin orbit torque (SOT)-MRAM. Thus, in the optical phase modulator in accordance with one or more embodiments, the configuration of either an STT-MRAM or an SOT-MRAM may be used. In addition, in the optical phase modulator in accordance with one or more embodiments, the configuration of a voltage torque-MRAM may be used.

In Variation 3, the electrode 16 may include a heavy metal. Examples of the heavy metal include palladium (Pd), platinum (Pt), tantalum (Ta), and tungsten (W). The electrode 16 may be made of any one of these heavy metals, or may be made of an alloy of more than one of these heavy metals. The electrode 16 may be made of an alloy of at least any of these heavy metals and a transition metal. Examples of the transition metal include iron (Fe), cobalt (Co), and copper (Cu). The electrode 16 may be constituted by a multilayer film including a layer made of at least any of the above-described heavy metals and a layer made of at least any of the above-described transition metals.

In Variation 3, the power supply PS connected to the electrode 16 is configured to generate a pulsed voltage. However, the power supply PS may be configured to generate the pulsed current. As used herein, the pulsed voltage means a voltage having a waveform in which the voltage exceeds a predetermined voltage for only a very short period of time in a case where a horizontal axis represents the time and a vertical axis represents the voltage. Further, the pulsed current means a current having a waveform in which the current exceeds a predetermined current in a short period of time in a case where a horizontal axis represents the time and a vertical axis represents the current. The pulsed voltage generated by the power supply PS connected to the electrode 16 may be a continuous pulse or may be a one-shot pulse.

Variation 3 may further include a spacer layer 14 interposed between the face 131 of the block 13 and the electrode 16. That is, the electrode 16 may be provided to the face 131, either directly on the face 131 or not directly on the face 131, via the spacer layer 14.

Example 2

Figure 5:
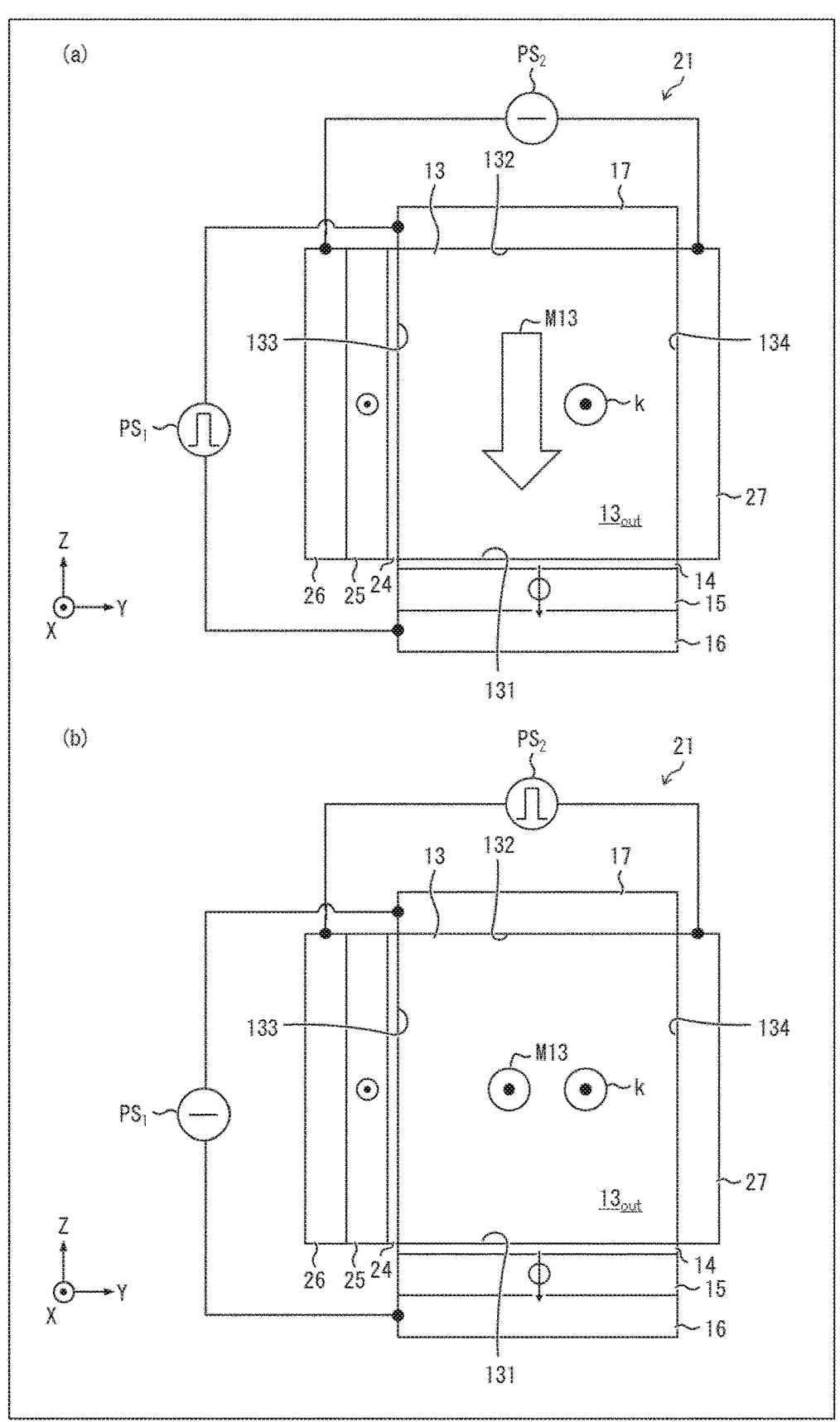
FIG. 5 is a schematic view of an optical phase modulator in accordance with Example 2.

The following description will discuss an optical phase modulator 21 in accordance with Example 2 with reference to FIG. 5. Both (a) and (b) of FIG. 5 are schematic views of the optical phase modulator 21. (a) of FIG. 5 illustrates a state in which a current flows from the electrode 17 to the electrode 16, and (b) of FIG. 5 illustrates a state in which a current flows from the electrode 27 to the electrode 26.

<Configuration of Optical Phase Modulator>

The optical phase modulator 21 is obtained by adding a spacer layer 24, a magnetic fixed layer 25, the electrode 26, and the electrode 27 to the optical phase modulator 11 described in Example 1 (see FIG. 5). Thus, in the description of Example 2, these members will be discussed. Members common to those of the optical phase modulator 11 are assigned the same reference signs, and the descriptions thereof are not repeated. Note that the magnetic fixed layer 15 is an example of the first magnetic fixed layer and employs a configuration of a perpendicular-to-plane magnetization type (see FIG. 2).

In a case where the entrance face 13in and the exit face 13out are regarded as a pair of bottom faces, the side faces of the block 13 are constituted by faces 131 to 134. The face 131, the face 132, the face 133 and the face 134 are an example of the first face, an example of the second face, an example of the third face, and an example of the fourth face, respectively. Note that the entrance face 13in is not illustrated in FIG. 5 (see, for example, FIG. 3).

(Spacer Layer)

The spacer layer 24 is a layered member made of an insulating material. The spacer layer 24 is interposed between the block 13 and the magnetic fixed layer 25 (described later) to insulate the block 13 from the magnetic fixed layer 15. The spacer layer 24 is configured similarly to the spacer layer 14, except that the face on which the spacer layer 24 is formed is not the face 131 but a face 133.

(Magnetic Fixed Layer)

The magnetic fixed layer 25 is a layered member made of an electrically conductive ferromagnetic material. In Example 2, the magnetic fixed layer 25 is provided to the face 133, not directly on the face 133, via the spacer layer 24. However, the magnetic fixed layer 25 may be provided directly on the face 133.

The ferromagnetic material of the magnetic fixed layer 25 is the same as the ferromagnetic material of the magnetic fixed layer 15. However, employed in Example 2 as the ferromagnetic material of the magnetic fixed layer 25 is a ferromagnetic material having a remanent magnetization at room temperature that is larger than the saturated magnetization at room temperature. As used herein, the remanent magnetization at room temperature being larger than the saturated magnetization at room temperature means that the remanent magnetization at room temperature is, for example, not less than 90% and not more than 100% of the saturated magnetization at room temperature.

Employed as the configuration of the magnetic fixed layer 25 is a configuration in which the magnetic fixed layer 25 is of an in-plane magnetization type and has a magnetization (hereinafter, a magnetization M25) parallel to a traveling direction of light (the positive x-axis direction illustrated in FIG. 5) (see FIG. 5). In this respect, the traveling direction of light is a direction trending from the entrance face 13in to the exit face 13out. In Example 2, the magnetization M25 may be substantially parallel to the traveling direction of light.

(Pair of Electrodes)

Both of the electrodes 26 and 27 which form a pair of electrodes are layered members made of a conductor. The conductor of the electrodes 26 and 27 is the same as the conductor of the electrodes 16 and 17, and the description thereof is not repeated here.

The electrode 26 is provided to the face 133 via the spacer layer 24 and the magnetic fixed layer 25. Thus, the spacer layer 24, the magnetic fixed layer 25, and the electrode 26 are disposed on top of each other on the face 133 in this order. The electrode 27 is provided directly on a face 134. In this way, the electrodes 26 and 27 are provided so as to face each other, and have the block 13, the spacer layer 24, and the magnetic fixed layer 25 sandwiched therebetween. The electrode 16 and the electrode 17 are an example of the third electrode and an example of the fourth electrode, respectively.

A positive electrode and a negative electrode of a power supply PS1 are connected to the electrode 17 and the electrode 16, respectively. A positive electrode or a negative electrode of a power supply PS2 is connected to each of the electrode 27 and the electrode 26 (see FIG. 5).

<Magnetization Direction of Block>

(a) of FIG. 5 is a schematic view illustrating a state in which a voltage is not applied to the electrode 27 and the electrode 26 via the power supply PS2 while a voltage is applied to the electrode 17 and the electrode 16 via the power supply PS1. (b) of FIG. 5 is a schematic view illustrating a state where the voltage is not applied to the electrode 17 and the electrode 16 via the power supply PS1 while a voltage is applied to the electrode 27 and the electrode 26 via the power supply PS2. Note that the power supply PS1 is assigned, for convenience, an altered name based on the name of the power supply PS illustrated in FIGS. 2 and 4, and has the same configuration as the power supply PS. The power supply PS2 is configured similarly to the power supply PS1.

The state illustrated in (a) of FIG. 5 is substantially the same as the state illustrated in (a) of FIG. 2 because, although the power supply PS2 is connected, an output thereof is zero. Thus, magnetic interaction occurs between the magnetic atoms contained in the block 13. This generates the magnetization M13 the direction of which is the positive y-axis direction. As a result, it is possible to delay the phase of the y-direction component of light, the light propagating through the block 13 so as to be parallel to the x-axis direction.

Further, as described above, employed as the ferromagnetic material of the magnetic fixed layer 25 is a ferromagnetic material having remanent magnetization at room temperature that is larger than the saturated magnetization at room temperature. Thus, the optical phase modulator 21 can delay the phase of a predetermined component (y-direction component) in a nonvolatile manner even after the injection of spin-polarized electrons into the block 13 is stopped.

In the state illustrated in (b) of FIG. 5, the output of the power supply PS1 is set to zero, and in exchange for this, a current is flowed in a direction (negative y-axis direction) trending from the electrode 27 to the electrode 26 in the optical phase modulator 21. That is, in the optical phase modulator 21, electrons flow in a direction (positive y-axis direction) trending from the electrode 26 to the electrode 27. Thus, the state illustrated in (b) of FIG. 5 is equivalent to a state obtained by rotating the optical phase modulator 11 illustrated in (b) of FIG. 4 by 90 degrees clockwise in an in-plane direction of the drawing. Thus, magnetic interaction occurs between the magnetic atoms contained in the block 13. This generates the magnetization M13 the direction of which is the positive x-axis direction. As a result, it is possible to eliminate a delay in phase of a directional component of light, the light propagating through the block 13 so as to be parallel to the x-axis direction.

As in the case of Variation 3 in the optical phase modulator 11, the spacer layer 14, the magnetic fixed layer 15, the electrode 17, the spacer layer 24, the magnetic fixed layer 25, and the electrode 27 can be omitted from the configuration of the optical phase modulator 21, in a variation of the optical phase modulator 21. That is, a variation of the optical phase modulator 21 may be configured to include: a block 13 including a face 131, a face 132, a face 133, a face 134, an entrance face 13in, and an exit face 13out; an electrode 16 provided to the face 131, either directly or not directly on the face 131; and an electrode 26 provided to the face 133, either directly or not directly on the face 133. The electrode 16 and the electrode 26 in the present variation can be configured similarly to the electrode 16 in Variation 3. Thus, the descriptions of the electrode 16 and the electrode 26 in the present variation will not be repeated. The power supply PS1 connected to the electrode 16 and the power supply PS2 connected to the electrode 26 can be configured so as to be the same as the power supply PS in Variation 3. Thus, descriptions of the power supply PS1 and the power supply PS2 will not be repeated.

Example 3

Figure 6:
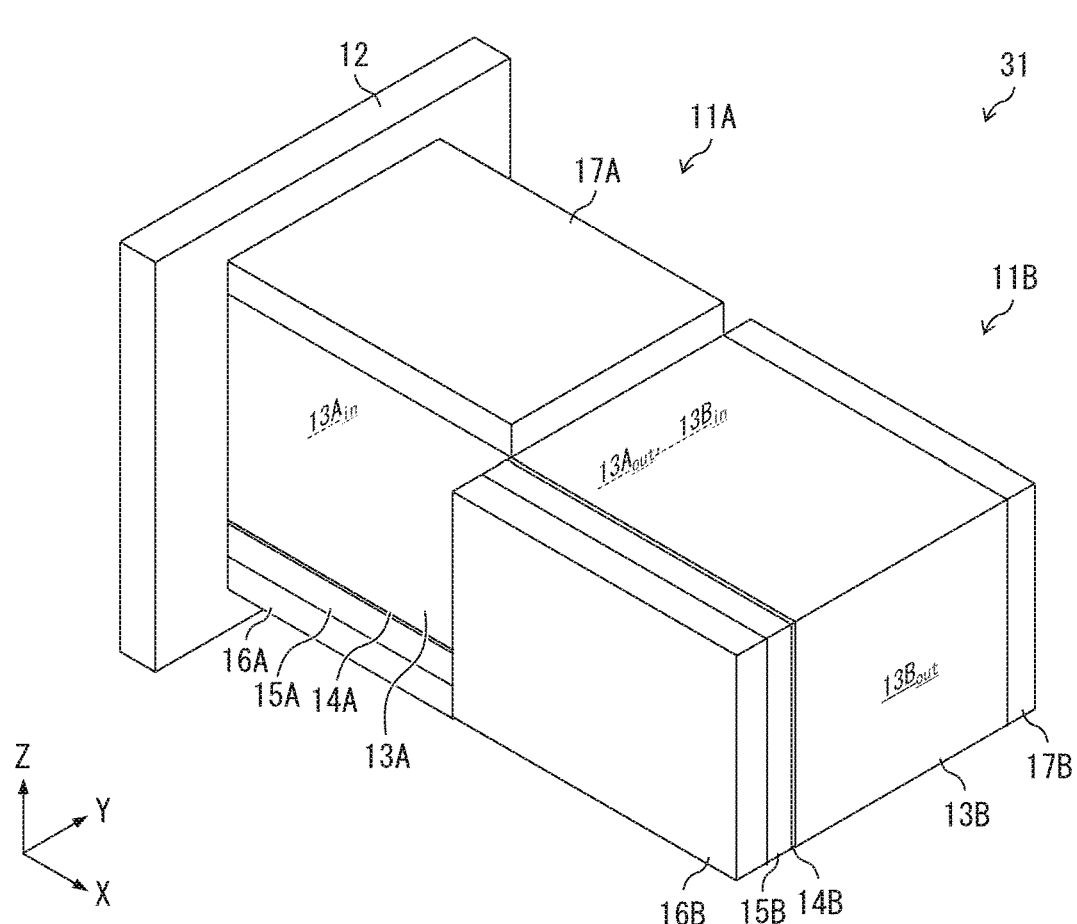
FIG. 6 is a perspective view of an optical phase modulator in accordance with Example 3.

The following description will discuss an optical phase modulator 31 in accordance with the Example 3 with reference to FIG. 6. FIG. 6 is a perspective view of the optical phase modulator 31.
<Configuration of Optical Phase Modulator>
The optical phase modulator 31 is obtained by using the optical phase modulator 11 described in Example 1 as a base, by adding one more optical phase modulator 11 having the same configuration as the optical phase modulator 11. Note that an optical phase modulator 11A illustrated in FIG. 6 is assigned, for convenience, an altered name based on the name of the optical phase modulator 11 illustrated in FIG. 1, and has the same configuration as the optical phase modulator 11. An optical phase modulator 11B is configured similarly to the optical phase modulator 11A. The optical phase modulator 11A and the optical phase modulator 11B are an example of the first optical phase modulator and an example of the second optical phase modulator, respectively. Note that, in Example 3, the components of the optical phase modulator 11A are assigned reference signs in which the letter "A" is added to the ends of the reference signs of the respective components of the optical phase modulator 11. Further, the components of the optical phase modulator 11B are assigned reference signs in which the letter "B" is added to the ends of the reference signs of the respective components of the optical phase modulator 11.

As illustrated in FIG. 6, a face (the back face of the optical phase modulator 11A) containing an entrance face 13Ain of a block 13A of the optical phase modulator 11A is fixed to one main face (the main face that is further in the positive x-axis direction) of the substrate 12.

An entrance face 13Bin of a block 13B of the optical phase modulator 11B is fixed to an exit face 13Aout of the block 13A of the optical phase modulator 11A. Thus, the exit face 13Aout and the entrance face 13Bin are optically coupled to each other. In Example 3, a resin having light transparency is used as a fixing member for fixing the exit face 13Aout and the entrance face 13Bin to each other. However, the fixing member is not limited to this.

In the description, the block 13A and the block 13B are assumed to be members separate from each other. However, in an aspect of the optical phase modulator 31, a block in which the block 13A and the block 13B are integrally molded may be employed. Even in this case, the exit face 13Aout and the entrance face 13Bin are optically coupled to each other. Further, in this case, the length (thickness of the block) of a side of the integrally molded block in the x-axis direction is approximately twice as long as the length L1 illustrated in FIG. 1.

The optical phase modulator 11A is oriented such that the direction trending from an electrode 16A to an electrode 17A is parallel to the z-axis direction. The optical phase modulator 11B is oriented such that the direction trending from an electrode 16B to an electrode 17B is parallel to the y-axis direction. Thus, in the optical phase modulator 31, a direction trending from the electrode 16A to the electrode 17A is orthogonal to a direction trending from the electrode 16B to the electrode 17B. However, the two directions are not limited to the orthogonal relationship, but may be configured to be substantially orthogonal to each other. Note that "being substantially orthogonal" refers to a state in which an angle at which the two directions intersect with each other is not less than 80° and not more than 100°.

Note that respective power supplies may be connected to the optical phase modulator 11A and the optical phase modulator 11B (e.g., see FIG. 5). Further, a single power supply may be connected to both the optical phase modulator 11A and the optical phase modulator 11B. In a case of connecting a single power supply, the optical phase modulator 11A and the optical phase modulator 11B should be connected in parallel to each other. With this configuration, it is possible to simultaneously drive the optical phase modulator 11A and the optical phase modulator 11B with use of a single power supply.

Alternatively, Variation 3 of the optical phase modulator 11 can be used instead of each of the two optical phase modulators 11A and 11B of the optical phase modulator 31.

Example 4

Figure 7:
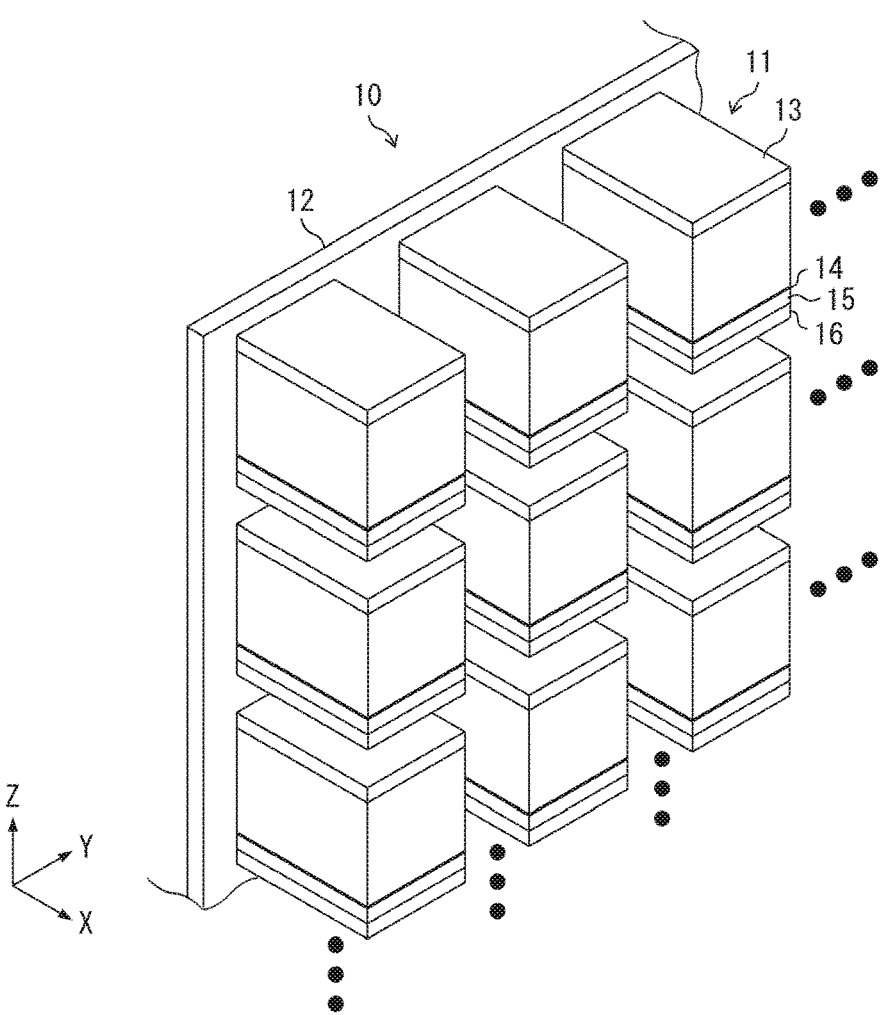
FIG. 7 is a perspective view of an optical device in accordance with Example 4.

The following description will discuss an optical device 10 in accordance with Example 4 with reference to FIG. 7. FIG. 7 is a side view of an optical device 10.

<Configuration of Optical Device>

As illustrated in FIG. 7, the optical device 10 includes a substrate 12 and a plurality of optical phase modulators 11.

The substrate 12 illustrated in FIG. 7 is configured similarly to the substrate 12 illustrated in FIG. 1. However, the area of the main faces of the substrate 12 illustrated in FIG. 7 is increased compared to the substrate 12 illustrated in FIG. 1. Note that the area of the main faces of the substrate 12 can be determined as appropriate according to the number of the optical phase modulators 11 provided to the main face. Further, of the main faces, forming a pair, of the substrate 12, a main face (located further in the positive x-axis direction) to which the plurality of optical phase modulators 11 are provided is an example of the specific face. The optical phase modulators 11 are arranged such that respective entrance faces 13in are disposed along one main face of the substrate 12 and periodically arranged in an in-plane direction of the one main face of the substrate 12. However, the respective entrance faces 13in of the optical phase modulators 11 may be disposed on a smooth curved face or may be disposed on a face having a step (e.g., an uneven face or a stepped face).

The optical phase modulator 11 used in Example 4 is configured so as to be identical to the optical phase modulator 11 illustrated in FIG. 1. However, each of the optical phase modulators constituting the optical device 10 is not limited to the optical phase modulator 11. For example, as each of the optical phase modulators constituting the optical phase modulator 31, the optical phase modulator 21 illustrated in FIG. 5 can be employed, or the optical phase modulator 31 illustrated in FIG. 6 can be employed.

The optical phase modulators 11 are periodically disposed in the in-plane direction of a main face of the substrate 12, the main face being located further in the positive x-axis direction. In Example 4, the optical phase modulators 11 are arranged in a matrix with a direction parallel to the y-axis direction regarded as a row direction and a direction parallel to the z-axis direction regarded as a column direction. However, the periodic structure in the case of disposing the optical phase modulators 11 is not limited to this.

In Example 4, the optical phase modulators 11 are periodically disposed throughout the entire effective region of the substrate 12. That is, all of the plurality of optical phase modulators 11 are periodically disposed. However, in one or more embodiments, at least some of the plurality of optical phase modulators 11 may be periodically disposed in at least a portion of the above-described effective region. In this case, the remaining optical phase modulators 11 are disposed non-periodically in the remaining region of the effective region. The number of the optical phase modulators 11 which are periodically disposed and the size of the region in which the at least some of the optical phase modulators 11 are periodically disposed are not limited, but can be determined as appropriate. Further, the number of regions in the effective region, the regions having therein the optical phase modulators 11 are periodically disposed, may be one, or may be more than one. In the case of the latter, the periods of the optical phase modulators 11 disposed in the respective regions may be the same or may be different from each other. Further, a plurality of periods may be mixed in a single area in which the optical phase modulators 11 are periodically disposed.

As described in Example 1, in a case where the entrance face 13in and the exit face 13out are regarded as a pair of bottom faces, the block 13 can be a columnar microcell. A Length L1 of each of the blocks 13, which is the thickness of each microcell, or a refractive index is individually set in each block 13.

(Specific Example of Periodic Arrangement)

In the optical phase modulators 11 provided to the above main face, examples of lengths L2 and L3 (see FIG. 1) include 800 μm. Examples of the number of the optical phase modulators 11 provided to the above main face include 4,000,000. In the case where 4,000,000 optical phase modulators 11 are arranged in a matrix as will be described later, the optical device 10 is constituted by the optical phase modulators 11 of, for example, 2,000 rows and 2,000 columns.

(Function of Optical Device)

When light having a spatial intensity distribution is incident on a face constituted by the entrance faces 13in of the respective optical phase modulators 11, it is possible for the optical device 10 configured as described above to convert the spatial intensity distribution of the incident light into another spatial intensity distribution according to the thicknesses or the refractive indexes of respective cells and then output the light. Thus, the optical device 10 is an aspect of a spatial optical phase modulator, and can be suitably used as a light diffraction element.

Note that, instead of each of the plurality of optical phase modulators 11 included in the optical device 10, Variation 3 of the optical phase modulator 11 can also be used.

Example 5

Figure 8:
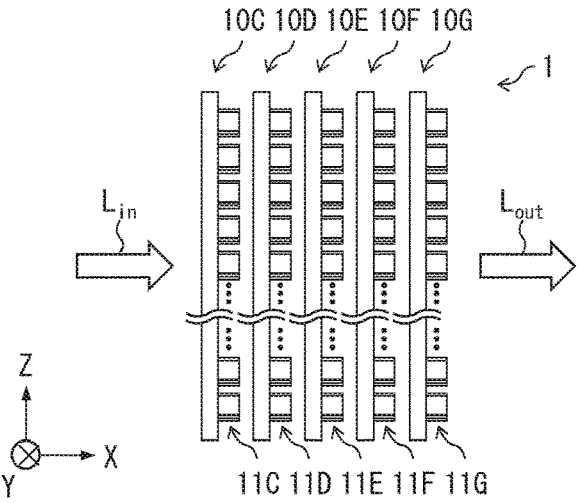
FIG. 8 is a side view of an optical computing device in accordance with Example 5.

The following description will discuss an optical computing device 1 in accordance with Example 5 with reference to FIG. 8. FIG. 8 is a side view of the optical computing device 1.

The optical computing device 1 includes five optical devices 10 illustrated in FIG. 7. Hereinafter, the five respective optical devices 10 are referred to as optical devices 10C, 10D, 10E, 10F, and 10G for discrimination. However, the number of the optical devices 10 constituting the optical computing device 1 only needs to be more than one, and can be determined as appropriate according to the intended use of the optical computing device 1.

The optical devices 10C, 10D, 10E, 10F, and 10G are disposed in this order along the normal direction (in FIG. 7, the positive x-axis direction) of substrates 12 thereof. The optical devices 10C, 10D, 10E, 10F, and 10G include optical phase modulators 11C, 11D, 11E, 11F, and 11G, respectively. The optical phase modulators 11C, 11D, 11E, 11F, and 11G illustrated in FIG. 8 are assigned, for convenience, altered names based on the name of the optical phase modulator 11 illustrated in FIG. 1, and have the same configuration as the optical phase modulator 11.

For example, a face of the optical device 10C that is closer to the substrate 12 can be used as the entrance face of the optical computing device 1 and a face of the optical device 10G that is closer to the exit face 13out of each of the blocks 13 constituting the optical device 10G can be used as the exit face of the optical computing device 1.

When light having a spatial intensity distribution enters each of the optical devices 10C, 10D, 10E, 10F, and 10G from the corresponding upstream stage, each of the optical devices 10C, 10D, 10E, 10F, and 10G functions as a light diffraction element which converts the spatial intensity distribution of the incident light into another spatial intensity distribution according to the thicknesses or the refractive indexes of respective cells, and then outputs the light to the corresponding downstream stage. The optical devices 10C, 10D, 10E, 10F, and 10G act on light having a spatial intensity distribution in sequence. This makes it possible for the optical computing device 1 to carry out optical computation.

In this case, the phase shift amount of light passing through each microcell (each block 13) in the optical devices 10C, 10D, 10E, 10F, and 10G can be adjusted afterward with use of the spin-polarized electrons. Thus, the optical computing device 1 can provide an optical computing device in which the content of computation is adjustable afterward.

(Other Uses of Spatial Optical Phase Modulator)

Examples of the use of the optical device 10, which is an aspect of a spatial optical phase modulator, include operation of optical information in three dimensions, an optical manipulator, and a wavefront control element, in addition to the above-described light diffraction element.

<Operation of Optical Information in Three Dimensions>

Examples of the operation of optical information in three dimensions include holography, which produces stereoscopic three-dimensional moving images. Examples of a device that utilizes holography include holographic data storage.

Holography, which produces stereoscopic three-dimensional moving images, may achieve a resolution of approximately 5,000 fringes/mm. In order for this resolution to be achieved, a spatial optical phase modulator in which the cell size of a pixel (i.e., the block 13) is, for example, approximately not less than 200 nm and not more than 500 nm is required. Unlike an LCOS and a DMD, the optical devices 10 illustrated in FIG. 7 has no restriction on the pixel size. Such an optical devices 10 is therefore expected to be able to provide the blocks 13 having a cell size of less than 100 nm. Thus, the optical device 10 can be suitably used for holography.

By using the optical device 10 in holographic data storage, it is possible to increase write density and reduce power consumption. Further, holographic data storage is more stable than hard disk drives, and therefore allows longer-term storage.

<Optical Manipulator>

Recently, optical elements having an effective region to which metasurface technology is applied and optical elements called diffractive optical element (DOE) have been becoming popular. These optical elements, when designed by use, function as lenses, beam splitters, pattern generators, beam shapers, diffractive lenses, lens arrays, cylindrical lenses, gratings, and random phase shifters. These optical elements are collectively referred to as optical manipulators. However, these optical elements are static optical elements and cannot be used for uses other than those designed in advance.

The optical device 10 is capable of adjusting afterward the phase shift amount of light passing through each microcell (each block 13), with use of spin-polarized electrons. The optical device 10, which is capable of adjusting afterward the phase shift amount in each microcell, is capable of providing a "dynamic" optical manipulator in which a certain function can be selected afterward from among the above-described functions.

Furthermore, optical manipulators are required to have microcells (blocks 13) each of which has a pixel size of not less than 10 nm and not more than 800 nm, in order to increase diffraction efficiency with respect to visible light and near-infrared light. Unlike an LCOS and a DMD, the optical device 10 has no restriction on the pixel size. Such an optical devices 10 is therefore expected to be able to provide the blocks 13 having a pixel size of not less than 10 nm and not more than 800 nm. Thus, the optical computing device 1 that includes a plurality of stages of the optical devices 10, is capable of providing a "dynamic" optical manipulator in which a certain function can be selected afterward from among various functions through design optimization.

The "dynamic" optical manipulator can also be suitably applied to the optical system of a 3D printer. Applying the "dynamic" optical manipulator to the optical system of a 3D printer yields the following effects.

Increasing the number of spots of a 3D printer to more than one.

Dynamically changing the pattern of a spot irradiated with laser light.

Dynamically changing the depth of laser light.

Automating learning of depth alignment and an optical axis even in a case where materials to be processed are different from each other (i.e., in a case where materials have different refractive indexes).

The "dynamic" optical manipulator is also suitably applicable to the optical system of analytical equipment. With this configuration, it is possible to satisfy resolution requirements which are required when simultaneous detection of multiple spots and spectral analysis are carried out. In a case of applying an LCOS and a DMD to the optical system of analytical equipment, the resolution is insufficient for carrying out the simultaneous detection of multiple spots and spectral analysis with use of visible light.

<Wavefront Control Element>

The optical device 10 can convert the spatial intensity distribution of incident light into another spatial intensity distribution. Thus, the optical device 10 can be suitably used in an optical head for writing information in an optical memory such as an optical disk, and a processing head of a laser processing machine.

Applying the optical device 10 to an optical head makes it possible to control afterward the wavefront of laser light for reading and/or writing. Further, according to this configuration, it is possible to control afterward noise that can be generated in the optical head. The same applies to the processing head of the laser processing machine.

(Aspects of One or More Embodiments can Also be Expressed as Follows)

An optical phase modulator in accordance with a first aspect of one or more embodiments includes: a block constituting a magnetic free layer, the block including: a first face and a second face which form a pair and which face each other; and an entrance face and an exit face which are not the first face or the second face and through which light enters and exits; a magnetic fixed layer provided to the first face, either directly or not directly on the first face; and a first electrode and a second electrode facing each other, the first electrode, the magnetic fixed layer, the block, and the second electrode being disposed in this order.

In the present optical phase modulator, a liquid crystal is not used unlike an LCOS, and a mirror that moves mechanically is not used unlike a DMD. An LCOS and a DMD need to have a certain degree of size for smooth operation because the operating principles thereof are based on bulk properties. When the structures are smaller, the influence of, for example, intermolecular force from the wall surface is stronger, especially at the nano-size level. This causes the original operability to be lost. In contrast, the present optical phase modulator, although the magnetic free layer is constituted by a block, is configured in the same manner as a spin transfer torque magnetic reversal (STT)-magnetoresistive random access memory (MRAM), and the operating principle thereof phenomena which originally occur in a nanosized space. The present optical phase modulator therefore is characterized by being closer to the original high-speed operation when being smaller in size. Thus, like an MRAM, the present optical phase modulator is capable of being made more compact and operating at high speed.

Spin-polarized electrons are injected into the block with use of a first electrode and a second electrode. The material of the block is magnetized by accumulation of the spin-polarized electrons. Light propagating from the entrance face to the exit face interacts with the magnetized block. This delays, among the light propagating from the entrance face to the exit face, linearly polarized light to a greater degree in phase than any other light, the linearly polarized light being polarized in a direction parallel to the magnetization direction of the block. That is, the present optical phase modulator is capable of modulating the phase of light.

Thus, with the present optical phase modulator, it is possible to provide an optical phase modulator capable of being made more compact and operating at high speed.

Note that, in the optical phase modulator, making the sizes of the entrance face and the exit face equal to or less than the wavelength of light entering the optical phase modulator allows a reduction in the zero-order light (unmodulated component) included in the light after modulation, and thereby allows an increase in the modulation efficiency.

Further, in the optical phase modulator in accordance with one or more embodiments, the magnetic fixed layer and the second electrode can be omitted from the configuration of the optical phase modulator in accordance with the above first aspect. That is, an optical phase modulator in accordance with one or more embodiments includes: a block constituting a magnetic free layer, the block including: a first face and a second face which form a pair and which face each other; and an entrance face and an exit face which are not the first face or the second face and through which light enters and exits; and a first electrode provided to the first face, either directly or not directly on the first face.

The optical phase modulator in accordance with the first aspect of one or more embodiments has a configuration similar to that of an STT-MRAM as described above, whereas the optical phase modulator in accordance with one or more embodiments is configured similarly to that of a spin orbit torque (SOT)-MRAM. Thus, like the optical phase modulator in accordance with one or more embodiments, the optical phase modulator in accordance with the first aspect of one or more embodiments is capable of being made more compact and operating at high speed.

In the optical phase modulator in accordance with one or more embodiments, the first electrode may contain a heavy metal.

With the above configuration, it is possible to increase the conversion efficiency at which a current is converted into a spin current polarized according to one spin.

An optical phase modulator in accordance with one or more embodiments further includes a power supply which is connected to the first electrode and which is for generating a pulsed voltage or a pulsed current.

With the above configuration, it is possible to further increase the conversion efficiency.

In addition to the above configuration of the optical phase modulator in accordance with the first aspect, employed in an optical phase modulator in accordance with a second aspect of one or more embodiments is a configuration in which the magnetic fixed layer has a magnetization direction orthogonal or substantially orthogonal to a direction trending from the entrance face to the exit face.

With the above configuration, it is possible to make the magnetization direction of the block orthogonal or substantially orthogonal to the propagation direction of light propagating from the entrance face to the exit face. This makes it possible to reliably modulate the phase of light.

In addition to the above configuration of the optical phase modulator in accordance with the first aspect or the second aspect, employed in an optical phase modulator in accordance with a third aspect of one or more embodiments is a configuration in which: the magnetic fixed layer is a first magnetic fixed layer; the block further includes a third face and a fourth face that are not the first face, the second face, the entrance face, or the exit face; and the optical phase modulator further includes: a second magnetic fixed layer (example of an additional magnetic fixed layer) provided to the third face; and a third electrode and a fourth electrode which form a pair and which face each other, the third electrode and the fourth electrode having the block and the second magnetic fixed layer sandwiched therebetween.

In addition to a current for injecting spin-polarized electrons with use of the first electrode and the second electrode (which is a first current), a current for injecting spin-polarized electrons with use of the third electrode and the fourth electrode (which is a second current) can flow through the block. Thus, the material of the block can also be magnetized, by interaction with the second current, in a direction (a second direction) different from the magnetization direction (a first direction) caused by the first current. In a case where the propagation direction of light propagating from the entrance face to the exit face is parallel or substantially parallel to the second direction, the magnetized block does not affect the phase of the light. With the above configuration, it is possible to not only delay the phase of the light with use of the first current but also cancel the delay in the phase of the light with use of the second current. This allows an increase in the flexibility in modulating the phase of light.

In addition to the above configuration of the optical phase modulator in accordance with the third aspect, employed in an optical phase modulator in accordance with a fourth aspect of one or more embodiments is a configuration in which the second magnetic fixed layer has a magnetization direction parallel or substantially parallel to a direction trending from the entrance face to the exit face.

With the above configuration, it is possible to make the magnetization direction of the block parallel or substantially parallel to the propagation direction of light propagating from the entrance face to the exit face. This makes it possible to reliably cancel a delay in the phase of light.

In addition to the above configuration of the optical phase modulator in accordance with any one of the first to the fourth aspects, employed in an optical phase modulator in accordance with a fifth aspect of one or more embodiments is a configuration in which: both a material of the block and a material of the magnetic fixed layer are ferromagnetic materials; and the material of the block has a smaller coercive force than the material of the magnetic fixed layer has.

With the above configuration, even after injection of spin-polarized electrons is stopped, the block has magnetization. This makes it possible for the present optical phase modulator to retain the degree of phase modulation in a nonvolatile manner even after the injection of spin-polarized electrons is stopped.

In addition to the above configuration of the optical phase modulator of any one of the first to fifth aspects, employed in an optical phase modulator in accordance with a sixth aspect of one or more embodiments is a configuration in which the optical phase modulator further includes a spacer layer which is interposed between the block and the magnetic fixed layer and which is a layered member made of an insulating material.

With the above configuration, it is possible to switch the magnetization of the block at higher speed with lower power.

Employed in an optical phase modulator in accordance with a seventh aspect of one or more embodiments is a configuration in which the optical phase modulator includes a first optical phase modulator and a second optical phase modulator each of which is the above optical phase modulator in accordance with any one of the first to sixth aspects, the entrance face of the second optical phase modulator is optically coupled to the exit face of the first optical phase modulator, and a direction trending from the first electrode to the second electrode in the first optical phase modulator is orthogonal or substantially orthogonal to a direction trending from the first electrode to the second electrode in the second optical phase modulator. Note that the direction trending from the first electrode to the second electrode in the first optical phase modulator may be construed as a direction trending from the first face to the second face in the block of the first optical phase modulator. Similarly, the direction trending from the first electrode to the second electrode in the second optical phase modulator may be construed as a direction trending from the first face to the second face in the block of the second optical phase modulator.

With the above configuration, it is possible to delay, among the light propagating from the entrance face to the exit face, linearly polarized light polarized in a direction parallel to the magnetization direction of the block in the second optical phase modulator in phase, in addition to linearly polarized light polarized in a direction parallel to the magnetization direction of the block in the first optical phase modulator. Furthermore, since the magnetization direction of the block (which are an upstream block) in the first optical phase modulator is orthogonal or substantially orthogonal to the magnetization direction of the block (which are a downstream block) in the second optical phase modulator, it is possible to delay the phase of light propagating from the entrance face to the exit face regardless of the polarization direction of the light.

An optical device in accordance with an eighth aspect of one or more embodiments includes a plurality of optical phase modulators each of which is the above optical phase modulator in accordance with any one of the first to sixth aspects. In the present optical device, at least some of the plurality of optical phase modulators are periodically disposed in an in-plane direction of a specific face.

With the above configuration, it is possible to provide a spatial optical phase modulator with use of a plurality of optical phase modulators each of which is the optical phase modulator in accordance with one or more embodiments. This makes it possible to provide a spatial optical phase modulator capable of being made more compact and operating at high speed. Examples of the use of the present spatial optical phase modulator include operation of optical information in three dimensions, an optical manipulator, and a wavefront control element.

In addition to the above configuration of the optical device in accordance with the eighth aspect, employed in an optical device in accordance with a ninth aspect of one or more embodiments is a configuration in which the block of each of the plurality of optical phase modulators is constituted by a columnar microcell having a thickness or a refractive index which is individually set.

In a case where light having a spatial intensity distribution enters the optical device, the present optical device functions as a light diffraction element that converts the spatial intensity distribution of the incident light into another spatial intensity distribution according to the thicknesses or the refractive indexes of respective cells and then outputs the light. Furthermore, each of the cells of the present optical device includes the optical phase modulator in accordance with one or more embodiments. Thus, the present optical device is capable of providing a light diffraction element which is capable of being made more compact and operating at high speed and in which the phase modulation amount of each cell is adjustable after production.

An optical computing device in accordance with a tenth aspect of one or more embodiments includes a plurality of optical devices each of which is the above optical device in accordance with the eighth or ninth aspect and which are disposed in sequence along a normal direction of the specific face. In the present optical computing device, each of the plurality of optical devices is configured to convert incident light having a spatial intensity distribution to light having another spatial intensity distribution and then output the light.

With the above configuration, each of the optical devices converts light having a spatial intensity distribution entering from the corresponding upstream stage into light having another spatial intensity distribution and then outputs the light to the corresponding downstream stage. The present optical device therefore functions as an optical computing multistage optical filter device because the present optical device acts in sequence on light that enters the optical device in the first stage and that has a spatial intensity distribution, to convert the spatial intensity distribution of the light in each stage of the sequence. Thus, the present optical computing device is capable of providing an optical computing device capable of being made more compact and operating at high speed.

Additional Remarks

Although the disclosure has been described with respect to only a limited number of embodiments, those skilled in the art, having benefit of this disclosure, will appreciate that various other embodiments may be devised without departing from the scope of the present invention. Accordingly, the scope of the invention should be limited only by the attached claims.

REFERENCE SIGNS LIST

1: Optical computing device
10, 10C to 10G: Optical device
11, 11A to 11G, 21, 31: Optical phase modulator
12: Substrate
13, 13A, 13B: Block (Magnetic free layer)
13in, 13out, 13Ain, 13Aout, 13Bin, 13Bout: Entrance face, exit face
131, 132, 133, 134: Face (first face, second face, third face, fourth face)
14, 24, 14A, 14B: Spacer layer
15, 25, 15A, 15B: Magnetic fixed layer
16, 26, 16A, 16B: Electrode (first electrode)
17, 27, 17A, 17B: Electrode (second electrode)

The invention claimed is:
1. An optical phase modulator comprising:

a block constituting a magnetic free layer and having:
a first face;
a second face opposite to the first face;
an entrance face different from the first face or the second face and through which light enters; and
an exit face different from the first face or the second face and through which light exits; and
a first electrode disposed to the first face, either directly or not directly on the first face, wherein
the block contains magnetic atoms.

2. The optical phase modulator according to claim 1, wherein the first electrode contains a heavy metal.

3. The optical phase modulator according to claim 1, further comprising:
a power supply connected to the first electrode and that generates a pulsed voltage or a pulsed current.

4. An optical device comprising:
optical phase modulators each of which is the optical phase modulator according to claim 1, wherein
two or more of the optical phase modulators are periodically disposed in an in-plane direction of a face of a substrate.

5. The optical device according to claim 4, wherein the block of each of the optical phase modulators is constituted by a columnar microcell having a thickness or a refractive index which is individually set.

6. An optical computing device comprising:
optical devices each of which is the optical device according to claim 4 and that are disposed in sequence along a normal direction of the face of the substrate, wherein
each of the optical devices converts incident light having a spatial intensity distribution to light having another spatial intensity distribution and outputs the converted light.

7. An optical phase modulator comprising:
a block constituting a magnetic free layer and having:
a first face;
a second face opposite to the first face;
an entrance face different from the first face or the second face and through which light enters; and
an exit face different from the first face or the second face and through which light exits; and
a first electrode disposed to the first face, either directly or not directly on the first face;
a magnetic fixed layer disposed to the first face, either directly or not directly on the first face; and
a second electrode disposed to the second face and opposite to the first electrode, wherein
the first electrode, the magnetic fixed layer, the block, and the second electrode are disposed in this order.

8. The optical phase modulator according to claim 7, wherein a magnetization direction of the magnetic fixed layer is orthogonal or substantially orthogonal to a direction from the entrance face toward the exit face.

9. The optical phase modulator according to claim 7, wherein
the block further has a third face and a fourth face that are different from the first face, the second face, the entrance face, or the exit face; and
the optical phase modulator further comprises:
an additional magnetic fixed layer disposed to the third face; and
a third electrode and a fourth electrode opposite to the third electrode and that have the block and the additional magnetic fixed layer sandwiched between the third electrode and the fourth electrode.

10. The optical phase modulator according to claim 9, wherein a magnetization direction of the additional magnetic fixed layer is parallel or substantially parallel to a direction from the entrance face toward the exit face.

11. The optical phase modulator according to claim 7, wherein
both a material of the block and a material of the magnetic fixed layer are ferromagnetic materials, and
the material of the block has a smaller coercive force than the material of the magnetic fixed layer has.

12. The optical phase modulator according to claim 7, further comprising:
a spacer layer interposed between the block and the magnetic fixed layer and that is a layered member including an insulating material.

13. An optical phase modulator comprising:
a first optical phase modulator and a second optical phase modulator each of which comprises:
a block constituting a magnetic free layer and having:
a first face;
a second face opposite to the first face;
an entrance face different from the first face or the second face and through which light enters; and
an exit face different from the first face or the second face and through which light exits; and
a first electrode disposed to the first face, either directly or not directly on the first face, wherein
the entrance face of the second optical phase modulator is optically coupled to the exit face of the first optical phase modulator, and
a direction from the first face toward the second face in the first optical phase modulator is orthogonal or substantially orthogonal to a direction from the first face toward the second face in the second optical phase modulator.

* * * * *